Dec. 1, 1931.                    H. BOCK                    1,834,444
                            METHOD OF WELDING
                            Filed June 26, 1929

H. BOCK
INVENTOR

By: Marks & Clerk
        Attys.

Patented Dec. 1, 1931

1,834,444

UNITED STATES PATENT OFFICE

HEINRICH BOCK, OF DUREN, GERMANY

METHOD OF WELDING

Application filed June 26, 1929, Serial No. 373,928, and in Germany April 4, 1929.

This invention relates to a method of uniting by welding the frontal walls with the shell of a metallic receptacle of drum-like shape, especially of cylindrical receptacles of aluminium. Effecting connections of this kind has hitherto been circumstantial, expensive and tedious, especially if the frontal walls have been thicker than the shell of the respective receptacle. Buttwelding of the shell unto the frontal walls is unreliable and can be carried out only with difficulty, and a connection by means of rivets is not safe enough, especially if aluminium receptacles are to be able to stand a high internal pressure. Also screw-threads in connection with tightening rings, etc., is impracticable, especially in such cases in which the frontal walls are to receive and to support heating or cooling tubes, in that in such cases the tightening or packing members if worn out cannot be replaced by new ones without destroying the respective tubes.

Figure 1:
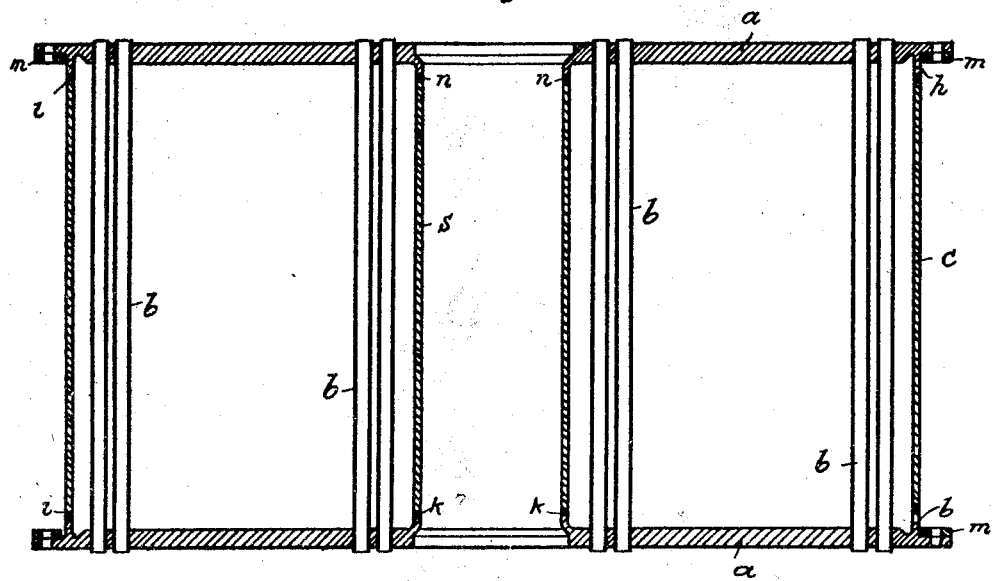
Figure 2:
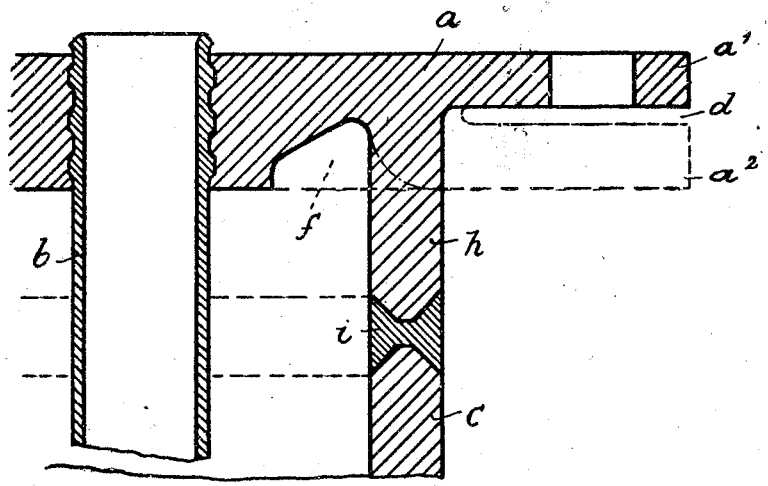

Now, according to the present invention an unobjectionable connection or union by welding is attained in the manner described hereinafter in connection with the accompanying drawings in which is shown diagrammatically and by way of example in Figure 1 an axial section through a cylindrical drum, the shell of which is united with the frontal walls according to this invention, and Figure 2 is a separate view of the righthand upper corner of Fig. 1, drawn to a greatly increased scale relatively to Fig. 1.

On the drawings $a$ denotes the frontal walls and $c$ the shell. As seen, the walls $a$ are considerably thicker than the shell $c$; they serve for supporting a large number of heating or cooling tubes $b$ (of which only a few are shown) and near the shell is in each frontal wall a circular groove $f$ in the inner face thereof. The grooves are produced, of course, by means of a suitable machine tool, such as a suitable lathe, and besides, a narrow, but deep groove $d$ is turned into the circumferential rim face or edge face of each wall $a$. The annular inner portion of each wall $a$ is bent at right angles inwardly, in the direction to the other wall $a$, that is to say, the portion $a^2$ shown in dotted lines in the righthand upper part of Fig. 2 is bent downwardly so as to form a sort of flange $h$. This is effected by a forging operation.

In the meantime the shell $c$ has been manufactured and suitably prepared so as to be fit for the buttwelding now to be made; $i$ denotes the welding places which are, of course, annular or circular and extend round the entire circumference of the shell. The manner of execution denoted by $i$ is, of course, only an example.

Where the material used for forming the flanges $h$ is lacking in the plane of the wall $a$, there rings $m$ may be attached to the remaining rim portion $a^1$ and connected with it, for instance, by screws.

In the example shown in Fig. 1 there is, besides the outer shell proper $c$, also a tubular inner shell $s$ which is connected or united with the frontal walls $a$ in practically the same manner as the shell $c$. $k$ denotes the inwardly bent flanges formed of portions of the walls $a$, and $n$ are the welding places which are accurately such ones as those denoted by $i$. Leaving annular portions like $a^1$ is omitted at the tubular shell $s$, and grooves like $d$ are, therefore, unnecessary, as the superfluous material is completely removed in any suitable manner.

Although I prefer to employ my improved method especially in connection with aluminium, I wish it to be understood that I by no means limit myself thereto. The method is applicable also in connection with receptacles, drums, and so on, of copper or any other metal.

I claim:

1. The method of uniting by welding the shell and the frontal walls of metallic receptacles, drums, and the like, which consists in forming grooves in the annular portions of the rim of each frontal wall to provide annular portions adapted to be bent into inwardly directed annular flanges, the diameter of which corresponds to the diameter of the shell, and uniting this latter with said flanges by butt-welding, substantially as set forth.

2. The method of uniting by welding the shell and the frontal walls of metallic receptacles, drums, and the like, the frontal walls of which are thicker than the shell, which consists in forming grooves in the annular portions of the rim of each frontal wall to provide annular portions adapted to be bent into inwardly directed annular portions, the thickness of which corresponds to the thickness of the shell, and the diameter of which corresponds to the diameter of the shell, and uniting this latter with said flanges by butt-welding, substantially as set forth.

3. The method of uniting by welding the shell and the frontal walls of metallic receptacles, drums, and the like, intended to be traversed by tubes, which consists in forming grooves in the annular portions of the rim of each of the frontal tube walls to provide annular portions adapted to be bent into inwardly directed annular flanges, the diameter of which corresponds to the diameter of the shell, and uniting this latter with said flanges by butt-welding, substantially as set forth.

4. A method of welding the frontal walls to a shell of relatively thinner metal to provide a metallic receptacle, which consists in forming recesses in the inner surface of the frontal walls near the perimeter, then forming a groove in the rims of the frontal walls to provide a portion bendable at right angles with respect to the walls to provide flanges, then bend said portion, then welding said flanges to the shell, then boring holes in the frontal walls and then inserting the ends of tubes in the frontal walls.

In testimony whereof I affix my signature.

HEINRICH BOCK.